US006490141B2

(12) United States Patent
Fischer et al.

(10) Patent No.: US 6,490,141 B2
(45) Date of Patent: Dec. 3, 2002

(54) POWER DISTRIBUTION SYSTEM

(75) Inventors: Erich Fischer, Altdorf (DE); Michael Naumann, Feucht (DE)

(73) Assignee: Ellenberger & Poensgen GmbH, Altdorf (DE)

(*) Notice: Subject to any disclaimer, the term of this patent is extended or adjusted under 35 U.S.C. 154(b) by 0 days.

(21) Appl. No.: 09/996,281

(22) Filed: Nov. 28, 2001

(65) Prior Publication Data

US 2002/0075620 A1 Jun. 20, 2002

Related U.S. Application Data

(63) Continuation of application No. PCT/EP00/04451, filed on May 17, 2000.

(30) Foreign Application Priority Data

May 28, 1999 (DE) ..................................... 299 09 206 U

(51) Int. Cl.⁷ ................................................. H02H 3/00
(52) U.S. Cl. .......................... 361/66; 361/63; 361/93.9; 361/78; 361/18
(58) Field of Search .......................... 361/62, 63, 93.2, 361/93.3, 93.9, 64, 65, 66, 18, 2, 19, 56, 57, 78; 307/42

(56) References Cited

U.S. PATENT DOCUMENTS

| 3,249,810 A | 5/1966 | Strom et al. |
|---|---|---|
| 4,733,319 A | 3/1988 | Yoshida et al. |
| 4,937,697 A | 6/1990 | Edwards et al. |
| 5,130,883 A | 7/1992 | Edwards |
| 5,367,424 A | 11/1994 | Even |
| 5,477,091 A | 12/1995 | Fiorina et al. |
| 5,526,216 A | 6/1996 | Konrad et al. |

(List continued on next page.)

FOREIGN PATENT DOCUMENTS

| CH | 497 059 | 11/1970 |
|---|---|---|
| DE | 127 138 | 9/1977 |
| DE | 233 897 A1 | 3/1986 |
| DE | 241 981 A1 | 1/1987 |
| DE | 36 42 624 A1 | 6/1988 |
| DE | 36 42 625 A1 | 6/1988 |
| DE | 88 12 781.8 U1 | 5/1989 |

(List continued on next page.)

OTHER PUBLICATIONS

Theo W. Smit: "Sensing resistor limits power–supply current", Electronics, Dec. 11, 1975, p. 107.

Primary Examiner—Stephen W. Jackson
Assistant Examiner—Michael Smith
(74) Attorney, Agent, or Firm—Laurence A. Greenberg; Werner H. Stemer; Gregory L. Mayback

(57) ABSTRACT

A power distribution system includes circuits each having an electronic circuit breaker as a protection for short-circuits and/or overloads, and a clocked power supply unit. The clocked power supply unit is connected to the circuits and feeds power to the circuits. The electronic circuit breaker has a power stage and an adjustable current limiting device connected to the power stage. The adjustable current limiting device, in the event of an overload, when a first adjustable current threshold is exceeded, turns off the power stage after a first adjustable disconnection time has expired, and in the event of a short circuit, after a second adjustable current threshold has been exceeded, turns off the power stage after a second disconnection time has expired.

13 Claims, 3 Drawing Sheets

U.S. PATENT DOCUMENTS

| | | |
|---|---|---|
| 5,693,986 A | 12/1997 | Vettraino, Jr. et al. |
| 5,828,140 A | 10/1998 | Shih |

FOREIGN PATENT DOCUMENTS

| | | |
|---|---|---|
| DE | 90 15 314.6 U1 | 3/1991 |
| DE | 39 32 776 A1 | 4/1991 |
| DE | 40 23 639 A1 | 4/1991 |
| DE | 40 05 815 A1 | 8/1991 |
| DE | 42 09 747 A1 | 9/1993 |
| DE | 42 31 037 A1 | 3/1994 |
| DE | 43 33 156 A1 | 3/1995 |
| DE | 44 29 716 C1 | 2/1996 |
| DE | 197 04 166 A1 | 8/1997 |
| DE | 196 48 562 A1 | 6/1998 |
| DE | 197 03 236 A 1 | 7/1998 |
| DE | 198 42 429 A 1 | 3/2000 |
| EP | 0 410 423 A2 | 1/1991 |
| EP | 0 432 847 A2 | 6/1991 |
| EP | 0 661 790 A2 | 7/1995 |
| GB | 1 424 912 | 2/1976 |
| JP | 09 284 981 A | 10/1997 |
| WO | WO 00/36726 | 6/2000 |

POWER DISTRIBUTION SYSTEM

CROSS-REFERENCE TO RELATED APPLICATION

This application is a continuation of copending International Application No. PCT/EP00/04451, filed May 17, 2000, which designated the United States.

BACKGROUND OF THE INVENTION

Field of the Invention

The invention relates to a power distribution system in the low-voltage range, in particular, in the 24V DC range, having a number of circuits each having an electronic circuit breaker as a short-circuit and/or overload protection.

Such a power distribution system is disclosed, for example, by German Published, Non-Prosecuted Patent Application DE 197 03 236 A1, corresponding to U.S. Pat. No. 6,157,089 to Xu.

In a power distribution or power supply system having a plurality of circuits fed jointly by a low-voltage power supply unit, high requirements are placed on operational reliability. In the main application of plant construction, there are loads, for example, in the form of actuators or sensors, in the circuits or current paths that are connected in parallel with one another and fed jointly by the power supply unit. In such a case, a mechanical circuit breaker, possibly a switching element (relay) and the actual load or the actuator or the sensor is usually disposed one behind another in each circuit or stream. The mechanical circuit breaker can operate in accordance with a thermal or in accordance with a thermal and a magnetic disconnection characteristic.

In a linearly controlled power supply unit or transformer power supply unit, usually employed in practice to supply power (having a rated current of, for example, 30 A and a short-circuit current of about 300 A) in the event of a short circuit, it is ensured, within an individual circuit, for example, that the fuse in the circuit also triggers. The reason for such is that the short-circuit current is always sufficiently high (for example, 100 A) to trigger the circuit breaker quickly enough. In addition, for the conventional case, in which twenty or more circuits are supplied simultaneously by such a single power supply unit, it is additionally ensured that, in the aforementioned short-circuit case, the output voltage supplied by the linear or linearly controlled power supply unit does not break down or breaks down only to an insignificant extent. As is also the case in the on-board controller for a motor vehicle disclosed by Xu, the aforementioned means that the circuits that are not affected continue to be supplied with the necessary power without disruption and, in particular, in a functionally reliable manner.

The behavior is different in the case of clocked power supply units that, on account of their comparatively small dimensions, are to be employed increasingly for the aforementioned application in plant construction. These clocked power supply units likewise supply the desired output voltage of, for example, 24 VDC, but only a short-circuit current of, for example, 33 A. The latter is, therefore, frequently only 10% higher than the rated current of the clocked power supply unit of, for example, 30 A. As opposed to the linearly controlled power supply unit, in the case of a clocked power supply unit it is not ensured that, in the event of a short circuit, that is to say, in the event of a short circuit within an individual circuit downstream of the circuit breaker, the latter also triggers reliably. The reason is because the clocked power supply unit, which protects itself by limiting its output, controls the voltage down appropriately or, in the case of long load lines, the short-circuit current necessary for triggering cannot flow because of the purely resistive line component.

In the extreme case, that is to say, also in the case of a short circuit in only one circuit, it is, therefore, possible for the output voltage from the clocked power supply unit, and, therefore, the supply voltage for the parallel circuits, to be controlled down at least approximately to zero volts (0 V). As such, virtually no (short-circuit) current flows through the actual circuit breaker in the relevant circuit. At the least, however, the latter is often too small to trigger the mechanical circuit breaker. A conventional circuit breaker as fuse in the relevant circuit may, therefore, trigger only thermally. However, this means that the triggering of such a circuit breaker, on account of the conventional thermal characteristic, only takes place after 20 sec, for example. During such time, the supply voltage is too low for the other circuits or current paths to ensure their reliable operation (power reset). Therefore, the entire part of the plant that is supplied by the clocked power supply unit is disrupted and, accordingly, no longer serviceable. In other words, in the event of a short circuit, even in only one individual circuit or current path, there is a reaction on the other, intact circuits, as a result of which the intact circuits are likewise disrupted. Operational reliability is, therefore, not reliably ensured. This is because there is no assurance that, in the event of a short circuit or else circuits an overload, the other in parallel with the affected circuit and likewise supplied by the clocked power supply unit will receive the necessary power, if the clocked power supply unit controls down its output and, therefore, the supply voltage.

Because, in addition, the mechanical circuit breaker in the affected circuit does not trigger, or triggers only with an extreme delay, it is virtually impossible to determine which circuit is affected, particularly because the other circuits are also disrupted due to the reaction. If "power-fail resets" are incorporated in the individual circuits or current paths, then all the circuits shut down in such a "worst case." If no such reset is incorporated, then the power in the further, intrinsically intact streams is in any case so low that the loads, in particular, the actuators or sensors, can no longer operate without faults.

SUMMARY OF THE INVENTION

It is accordingly an object of the invention to provide a power distribution system that overcomes the hereinafore-mentioned disadvantages of the heretofore-known devices of this general type and that has a plurality of circuits supplied jointly by a clocked power supply unit in which the aforementioned disadvantages are avoided and ensures a high operational reliability of the overall system. In particular, a suitable protective device is supplied for such a power distribution system.

With the foregoing and other objects in view, there is provided, in accordance with the invention, a power distribution system includes circuits each having an electronic circuit breaker as a protection for at least one of short-circuits and overloads, and a clocked power supply unit connected to the circuits and feeding power to the circuits. In particular, the power distribution system is in the 24V DC range. The electronic circuit breaker has a power stage and an adjustable current limiting device connected to the power stage. The adjustable current limiting device, in the event of an overload and when a first adjustable current threshold is exceeded, turns off the power stage after a first adjustable disconnection time has expired, and in the event of a short circuit and after a second adjustable current threshold has been exceeded, turns off the power stage after a second disconnection time has expired.

According to the invention, an electronic circuit breaker is inserted into each of the circuits supplied by the clocked power supply unit in the power distribution system. The circuit breaker is used substantially to limit the current within the circuit affected by short circuit and/or overload. In such a case, the current limiting device is advantageously adjustable, that is to say, can be regulated or controlled actively.

For such a purpose, the electronic circuit breaker expediently includes a power stage, preferably, in the form of a semiconductor, for example, a power MOS transistor, which is turned on completely in the normal state, that is to say, with an intended load current in the respective circuit.

In accordance with another feature of the invention, the adjustable current limiting device is programmed to turn off the power stage after a first adjustable disconnection time has expired in the event of an overload and when a first adjustable current threshold is exceeded, and programmed to turn off the power stage after a second disconnection time has expired in the event of a short circuit and after a second adjustable current threshold has been exceeded.

In accordance with a further feature of the invention, the adjustable current limiting device has a means for turning off the power stage after a first adjustable disconnection time has expired in the event of an overload and when a first adjustable current threshold is exceeded, and a means for turning off the power stage after a second disconnection time has expired in the event of a short circuit and after a second adjustable current threshold has been exceeded.

In accordance with an added feature of the invention, the electronic circuit breaker has a measured-value registration part for measuring a load current flowing in a corresponding one of the circuits, and a control stage adjusting current limiting of the power stage and turning the power stage off as a function of time, the control stage connected to the power stage and the measured-value registration part.

The measured, value registration part is, for example, a shunt, with which, in particular, the load current flowing through the respective circuit is registered. Also provided is a control stage that, by using the registered load current and, preferably, by using the voltage across the load stage, that is to say, the voltage drop across the semiconductor, supplies an appropriate control signal for the power stage.

In the event of an overload, for example, in the range of 105% to 200% of the rated current of the load stage, and, therefore, in the event that a first adjustable current threshold is exceeded, a timer expires. The time expiry can be, for example, 1 sec to 20 sec, in particular, 5 sec, which corresponds to the thermal characteristic of a conventional circuit breaker. After the timer has expired, the power circuit breaker, that is to say, the power stage, is switched off. In the case of a semiconductor, this means that it is turned off and can be turned on again only by a reset.

In accordance with an additional feature of the invention, the adjustable current limiting device electromagnetically isolates a relevant one of the circuits from the power supply unit in the event of one of the group consisting of a short circuit and an overload. The isolation can be done by a controllable triggering relay with additional indicator, which is then activated appropriately by the control stage and isolates the affected circuit electromechanically from the power supply unit. To perform the isolation, in accordance with yet another feature of the invention, the adjustable current limiting device is programmed to electromagnetically isolate a relevant one of the circuits from the power supply unit in the event of one of the group consisting of a short circuit and an overload. Alternatively, in accordance with n yet a further feature of the invention, the adjustable current limiting device has a means for electromagnetically isolating a relevant one of the circuits from the power supply unit in the event of one of the group consisting of a short circuit and an overload.

In the event of a short circuit, in theory, the short-circuit current would exceed a predefinable second current threshold, which, for example, is 200% of the rated current of the power stage. However, the current flowing through the affected circuit will be (current) limited to preferably 200% of the rated current, that is to say, to twice the rated current of the power stage. Current limitation can also be carried out, for example, at more or less than 200% of the rated current.

In the event of a short circuit, therefore, the magnetic characteristic of a conventional circuit breaker will be simulated. In addition, the voltage across the power stage and, therefore, the voltage drop across the switched-on semiconductor can be registered. The voltage value across the power stage specifies the disconnection rate, that is to say, after the expiry of what time the semiconductor will be turned off. If, for example, only a small part of the supply voltage from the clocked power supply unit is present across the semiconductor, then disconnection will take place, for example, only after 500 ms. If, on the other hand, the entire power supply voltage is across the semiconductor, then disconnection will take place after, for example, at most 5 ms.

The advantages achieved by the invention reside, in particular, in the fact that when a clocked power supply unit is used for the simultaneous supply of a large number of circuits connected in parallel to the output side of the clocked power supply unit, high operational reliability of the corresponding power distribution system is ensured by the use of electronic circuit breakers in each circuit. At the same time, in the event of an overload and/or short circuit in one of the circuits fed, adequate line protection in the circuit is ensured and the other circuits are supplied with, if possible, an undiminished output. In the event of a short circuit and/or overload, the output voltage from the clocked power supply unit, and, therefore, the supply voltage for the intact circuits, does not fall or falls only to an insignificant extent below the nominal or intended voltage. In particular, in the event of a short circuit in a circuit, first of all current limitation over the affected circuit is carried out reliably, so that the output voltage of the clocked power supply unit is at least virtually completely maintained.

By the use of such electronic circuit breakers in each of the parallel circuits supplied jointly by the clocked power supply unit, virtually reaction-free short-circuit and/or overload protection of the entire power distribution system is ensured. The reason for the effect is that, even in the event of failure of a circuit, the electronic circuit breaker, by virtue of the actively controlled current limitation in the circuit, ensures that the other circuits are not affected to the extent that the output voltage from the clocked power supply unit is maintained virtually unchanged. The circuit breaking device having a number of electronic circuit breakers corresponding to the number of circuits supplied jointly by a clocked power supply unit is, therefore, particularly suitable for power or current distribution in the 24 V DC range, whose classic application is in plant construction, in particular, in the automobile industry.

In accordance with a concomitant feature of the invention, at least one of the circuits has a fail-safe element for redundant line protection and/or reverse polarity protection. The fail-safe element can be connected to the power stage and/or the control stage.

Other features that are considered as characteristic for the invention are set forth in the appended claims.

Although the invention is illustrated and described herein as embodied in a power distribution system, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
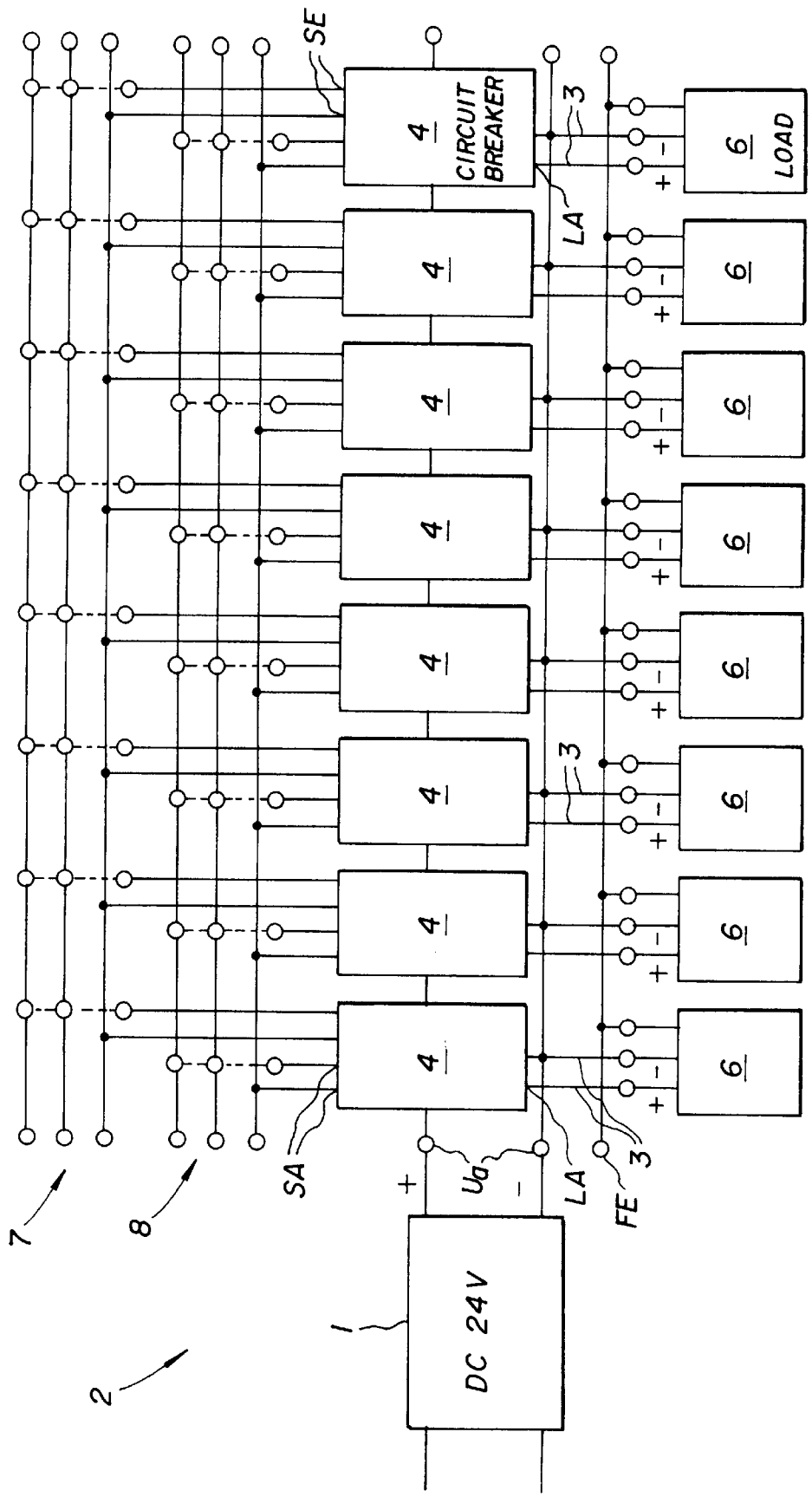
FIG. 1 is a schematic circuit diagram of a power distribution system having a number of circuits supplied jointly by a clocked power supply unit and having electronic circuit breakers as a protective device according to the invention.

Referring now to the figures of the drawings in detail and first, particularly to FIG. 1 thereof, there is shown a clocked power supply unit 1 of a power supply or power distribution system 2 is connected on the output side to a large number of parallel circuits or current paths 3, each of which has an electronic circuit breaker 4. Connected downstream of the electronic circuit breaker 4, in turn—if required through a non-illustrated relay or a similar switching element—is a load, an actuator, a sensor or, in general terms, a load 6. Each electronic circuit breaker 4 is connected through its LINE input LE to the positive terminal (+) of the clocked power supply unit 1. The respective LOAD output LA of the electronic circuit breaker 4 is connected to the respective load 6 through the switching element or—if the switching element is not required or provided—directly. The loads 6 are connected to a common functional ground FE. The circuits 3 are jointly connected through the negative terminal (−) of the clocked power supply unit 1, a supply line for the service supply to the respective electronic circuit breaker 4 being connected to the negative terminal (ground). The output voltage $U_a$ of the clocked power supply unit 1 is, for example, 24 V DC, while the rated or power current is, for example, 30 A and the short-circuit current is, for example, 33 A.

The identically constructed electronic circuit breakers 4 have control inputs SE and signal outputs SA that, in the exemplary embodiment, are routed to a common control line or bus interface 7 and to a common signal line or bus interface 8. The electronic circuit breakers 4 and the current paths 3 associated with the electronic circuit breakers 4 can also be combined into groups, a plurality of circuit breakers 4, for example, four circuit breakers 4 or circuit-breaker functions, including the associated current paths 3, then being integrated into one component. In addition, the electronic circuit breakers 4, including the current paths 3 associated with them, can be disposed together with the clocked power supply unit 1 in a common housing.

Figure 2:
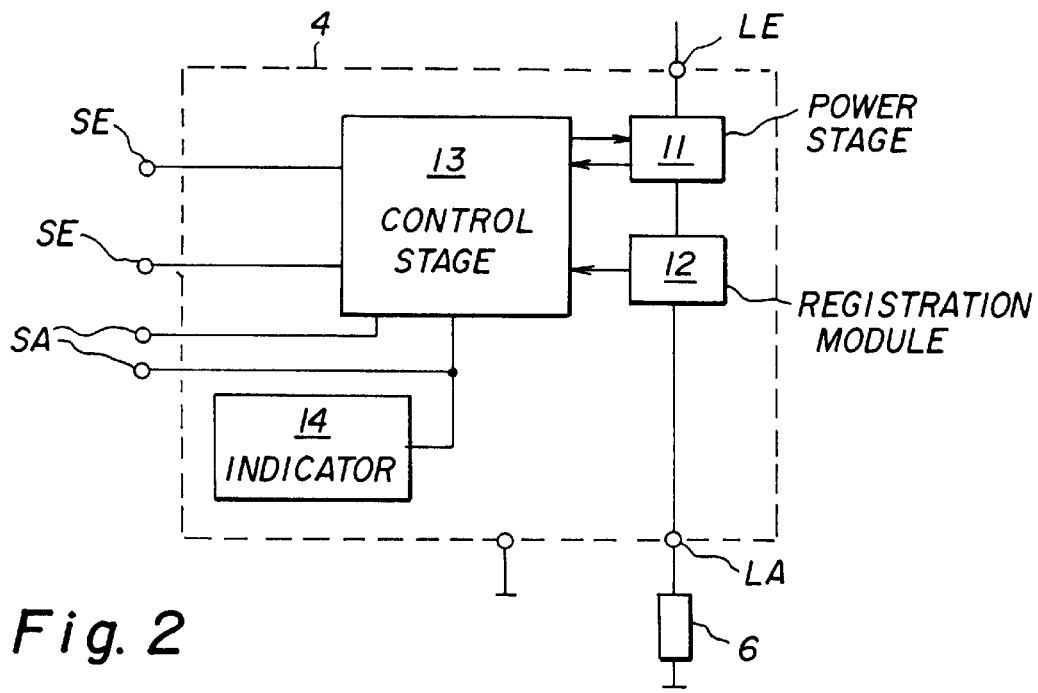
FIG. 2 is a block circuit diagram of the functional components of the electronic circuit breaker of FIG. 1.
Figure 3:
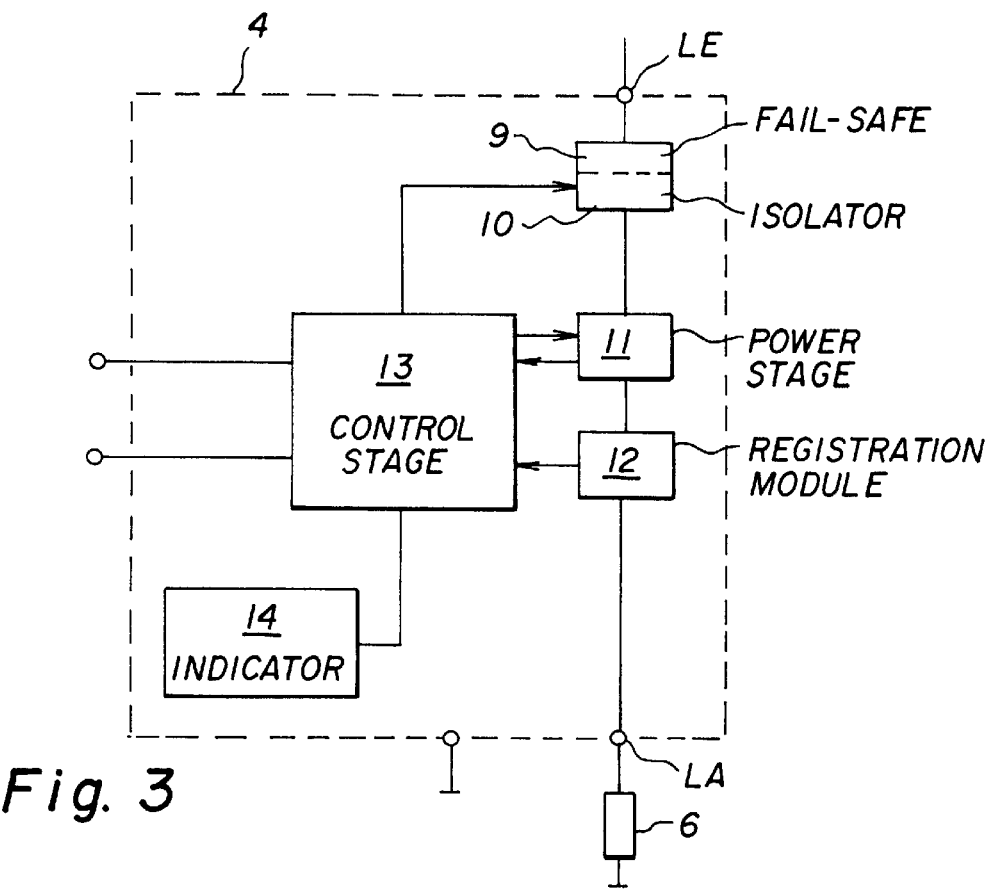
FIG. 3 is a block circuit diagram of the electronic circuit breaker of FIG. 2 with a fail-safe element and with an electromechanical isolating device.

The respective electronic circuit breaker 4 is illustrated functionally in FIGS. 2 and 3. FIG. 3 shows an electronic circuit breaker 4 expanded by a fail-safe element 9 and by an electromagnetic isolating device 10, for example, in the form of a triggering relay. The electronic circuit breaker 4 includes a power stage 11 that is connected to the LINE input LE and that is routed through a measured-value registration part 12 to the LOAD output LA. Connected to the LOAD output LA, with respect to the negative terminal and, therefore, with respect to ground, is the respective actuator or sensor or, if appropriate through a corresponding switching element, the load and, therefore, the respective load 6. The measured-value registration part or a corresponding registration module 12, for example, a shunt, is connected to a control stage 13. The control stage 13 is also fed with the value of the voltage across the power stage 11, that is to say, in the event of a semiconductor that is turned on as a power stage 11, the voltage drop across the latter.

The semiconductor as a power stage 11 is, for example, a power MOS transistor. To supply the power stage 11 with power, the control stage 13 is connected on one side to the LINE input LE and on the other side to ground, that is to say, to the negative terminal (−) of the clocked power supply unit 1. On the control side, the control stage 13 is connected to the power stage 11. In the normal state, that is to say in the fault-free state of the circuit 3, the control stage 13 adjusts the power stage 13 such that the load current supplied by the clocked power supply unit 1 flows virtually completely through the power stage 13 and, therefore, to the corresponding load, actuator, or sensor or to the load 6. In the case in which a semiconductor is turned on, this means that the semiconductor is turned on fully.

Figure 4:
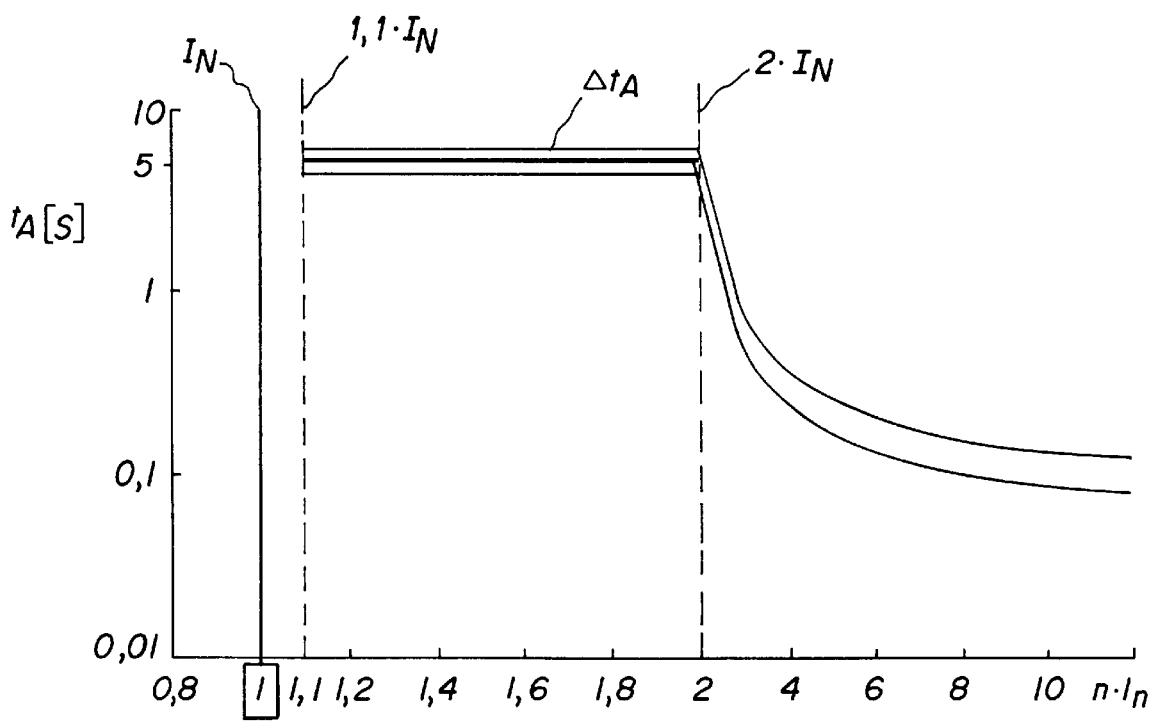
FIG. 4 is a current/time graph illustrating the characteristic of the electronic circuit breaker according to the invention.

As can be seen from the current/time characteristic according to FIG. 4 of the electronic circuit breaker 4, in the event of a short circuit, the current is limited by driving the power stage 11 appropriately. In such a case, the respective multiple n of the rated current $I_N$ is plotted on the abscissa, and the disconnection time $t_A$ in seconds (s) is plotted on the ordinate. The (second) current threshold used is preferably twice the rated current $I_N$ ($2 \cdot I_N$) of the power stage 11.

The typical disconnection point is at 110% of the rated current $I_N$ ($1.1 \cdot I_N$). Between 1.1 times and twice the rated current $I_N$, the disconnection time $t_A$ preferably lies in the range of $t_A$=5 sec, a permissible tolerance band $\Delta t_A$ about the latter being indicated as a value illustrated by a thick line. The voltage value fed to the control stage 13 from the power stage 11 can be used as an additional control variable for that time interval during which the power stage 11 is turned off and, therefore, the circuit 3 is virtually switched off. In addition, electromechanical isolation can be carried out by the triggering relay 10 that, for such a purpose, is driven appropriately by the control stage 13. As a result, the affected circuit 3 is isolated completely from the power supply unit 1.

In the event of a short circuit, the electronic circuit breaker 4, thus, simulates the magnetic disconnection characteristic of a conventional mechanical circuit breaker. Above twice the rated current $I_N$, however, active current limitation is effective at $2 \cdot I_N$, so that the unaffected or intact circuits 3 are supplied without reaction with virtually unchanged output voltage from the power supply unit 1. The decaying waveform of the current characteristic in FIG. 4 above twice the rated current $I_N$ in such a case indicates the theoretical overload current. In the range, the short-circuit current can be registered directly and/or by measuring the voltage drop across a power transistor belonging to the power stage 11. The higher the theoretical short-circuit current, the more quickly disconnection is carried out. Short-circuit disconnection is expediently carried out after a disconnection time of $t_A$=100 ms has expired.

In the event of an overload, a current range of, for example, again 110% to 200% of the rated current $I_N$ of the power stage 11 can be predefined, the 110% of or 1.1 times the rated current $I_N$ being adjustable or predefinable virtually as desired as the lower (first) current threshold. If the load current $I_N$ lies within the current range between $1.1 \cdot I_N$ and $2 \cdot I_N$, then a timer will be started, the power stage 11 being switched off. Therefore, the affected circuit 3 is switched off only after its time has expired, for example, after 5 s. In the event of an overload, the electronic circuit breaker 4, thus, simulates the thermal disconnection characteristic of a conventional mechanical circuit breaker.

In addition, the control stage 13 has the control input SE, through which the power stage 11 can be driven externally through the bus interface 7. Also provided are control or signal outputs SA from the control stage 13, which can be routed firstly to the bus interface 8, to display and to report the operating and/or malfunction of the affected circuit 3 in a higher-order control system. Such a signal output SA can be routed to an optical indicator 14 in the form, for example, of a light-emitting diode (LED), with which the operating or malfunction can be indicated on the respective circuit breaker 4 itself, even selectively following a short circuit or overload.

A further element in the electronic circuit breaker 4 according to FIG. 3 is the fail-safe element 9. The important factor in the connection is that the protective device according to the invention not only provides device protection but, in particular, also line protection. The fail-safe element 9 is used first to secure the circuit of the electronic circuit breaker 4 against reverse polarization (reverse polarization protection). Second, the element 9 is used to perform the protective function if, for example, the power stage 11 fails (redundancy). The fail-safe element 9 used is preferably an expanding-wire fuse. It is important that the fail-safe fuse responds only when the main fuse, that is to say, the electronic circuit breaker 4, is defective. If, for example, the electronic circuit breaker 4 is constructed for 6 A—corresponding to twice the rated current $I_N$=3 A—then the fail-safe fuse 9 is constructed to be higher, for example, for 8 A. The fail-safe element 9 expediently effects disconnection only when the power stage 11 and/or the control stage 13 fails.

Therefore, the important functional features of the electronic circuit breaker 4 include, first, the actively adjustable current limitation and the adjustable current thresholds for overload or short circuit, as a function of the predefinable rated current $I_N$ of the power stage 11, and also the switching function. Second, the electronic circuit breaker 4 has, as a functional feature, the overload-dependent disconnection characteristic according to FIG. 2 as a simulation, for example, of thermal or thermal/magnetic or magnetic/hydraulic circuit-breaker characteristics.

We claim:

1. A power distribution system, comprising:

circuits each having an electronic circuit breaker as a protection for at least one of short-circuits and overloads;

a clocked power supply unit, said clocked power supply unit connected to said circuits and feeding power to said circuits; and said electronic circuit breaker having:
      a power stage; and
      an adjustable current limiting device connected to said power stage, said adjustable current limiting device:
         in the event of an overload and when a first adjustable current threshold is exceeded, turning off said power stage after a first adjustable disconnection time has expired; and
         in the event of a short circuit and after a second adjustable current threshold has been exceeded, turning off said power stage after a second disconnection time has expired.

2. The power distribution system according to claim 1, wherein said adjustable current limiting device is:

programmed to turn off said power stage after a first adjustable disconnection time has expired in the event of an overload and when a first adjustable current threshold is exceeded; and programmed to turn off said power stage after a second disconnection time has expired in the event of a short circuit and after a second adjustable current threshold has been exceeded.

3. The power distribution system according to claim 1, wherein said adjustable current limiting device has:

a means for turning off said power stage after a first adjustable disconnection time has expired in the event of an overload and when a first adjustable current threshold is exceeded; and a means for turning off said power stage after a second disconnection time has expired in the event of a short circuit and after a second adjustable current threshold has been exceeded.

4. The power distribution system according to claim 1, wherein the power distribution system is in the 24V DC range.

5. The power distribution system according to claim 1, wherein said electronic circuit breaker has:

a measured-value registration part for measuring a load current flowing in a corresponding one of said circuits; and a control stage adjusting current limiting of said power stage and turning said power stage off as a function of time, said control stage connected to said power stage and said measured-value registration part.

6. The power distribution system according to claim 1, wherein said adjustable current limiting device electromagnetically isolates a relevant one of said circuits from said power supply unit in the event of one of the group consisting of a short circuit and an overload.

7. The power distribution system according to claim 1, wherein said adjustable current limiting device is programmed to electromagnetically isolate a relevant one of said circuits from said power supply unit in the event of one of the group consisting of a short circuit and an overload.

8. The power distribution system according to claim 1, wherein said adjustable current limiting device has a means for electromagnetically isolating a relevant one of said circuits from said power supply unit in the event of one of the group consisting of a short circuit and an overload.

9. The power distribution system according to claim 1, wherein at least one of said circuits has a fail-safe element for at least one of redundant line protection and reverse polarity protection.

10. The power distribution system according to claim 5, wherein:
at least one of said circuits has a fail-safe element for at least one of redundant line protection and reverse polarity protection; and
said fail-safe element is connected to at least one of said power stage and said control stage.

11. The power distribution system according to claim 5, wherein:
at least one of said circuits has a fail-safe element for at least one of redundant line protection and reverse polarity protection; and
said fail-safe element is connected to said power stage and said control stage.

12. A power distribution system, comprising:
circuits each having an electronic circuit breaker as a protection for at least one of short-circuits and overloads;
a clocked power supply unit, said clocked power supply unit connected to said circuits and feeding power to said circuits;
said electronic circuit breaker having:
a power stage; and
a means for adjustably limiting current turning off said power stage after a first adjustable disconnection time has expired in the event of an overload and when a first adjustable current threshold is exceeded, and turning off said power stage after a second disconnection time has expired in the event of a short circuit and after a second adjustable current threshold has been exceeded.

13. In a power distribution system having circuits and a clocked power supply unit feeding power to the circuits, at least one electronic circuit breaker connected to the circuits for protecting the circuits from at least one of short-circuits and overloads, the circuit breaker comprising:
a power stage; and
an adjustable current limiting device connected to said power stage, said adjustable current limiting device:
in the event of an overload and when a first adjustable current threshold is exceeded, turning off said power stage after a first adjustable disconnection time has expired; and
in the event of a short circuit and after a second adjustable current threshold has been exceeded, turning off said power stage after a second disconnection time has expired.

* * * * *